UNITED STATES PATENT OFFICE.

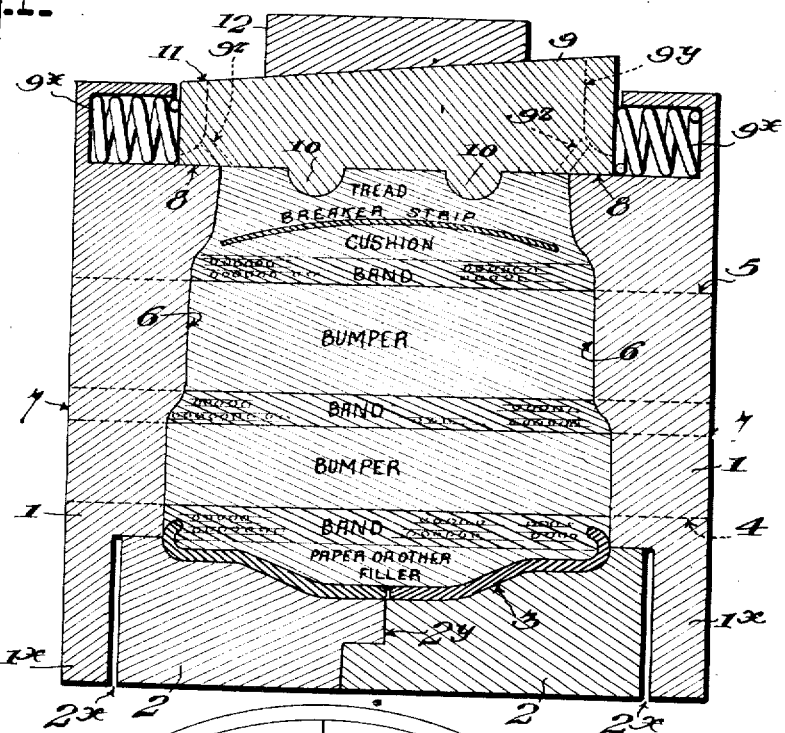
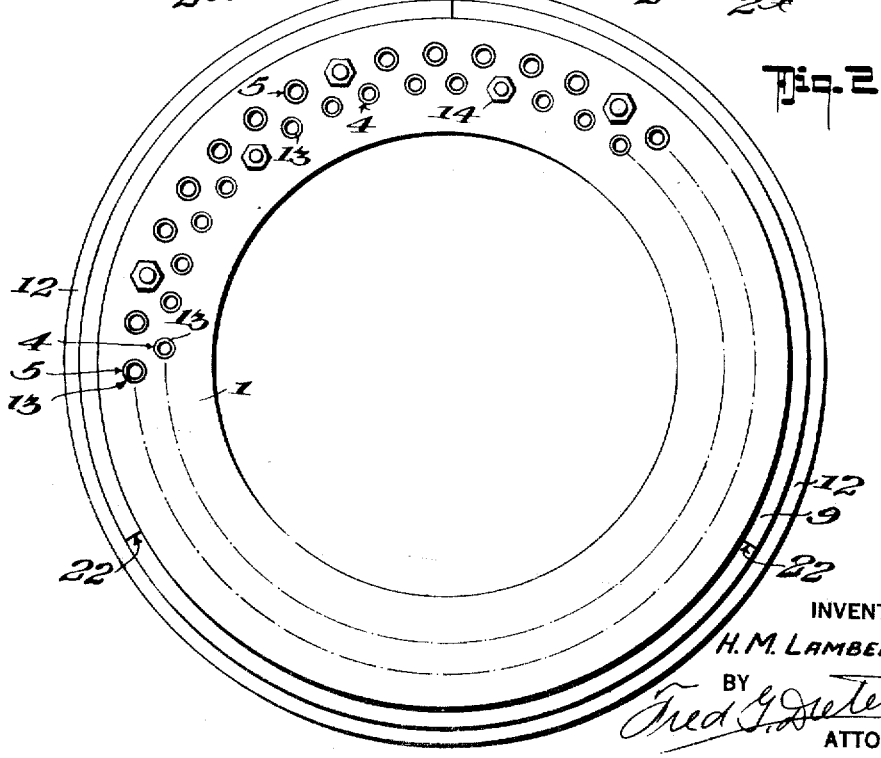

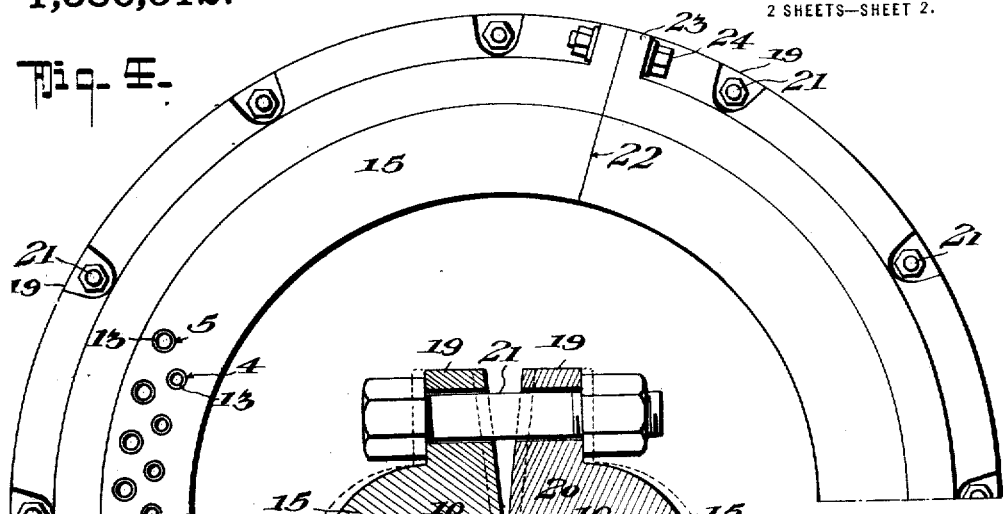
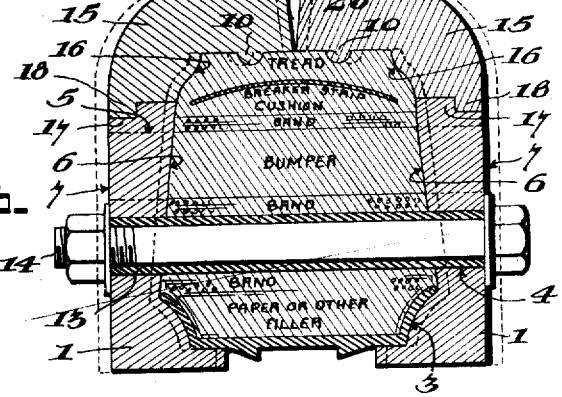
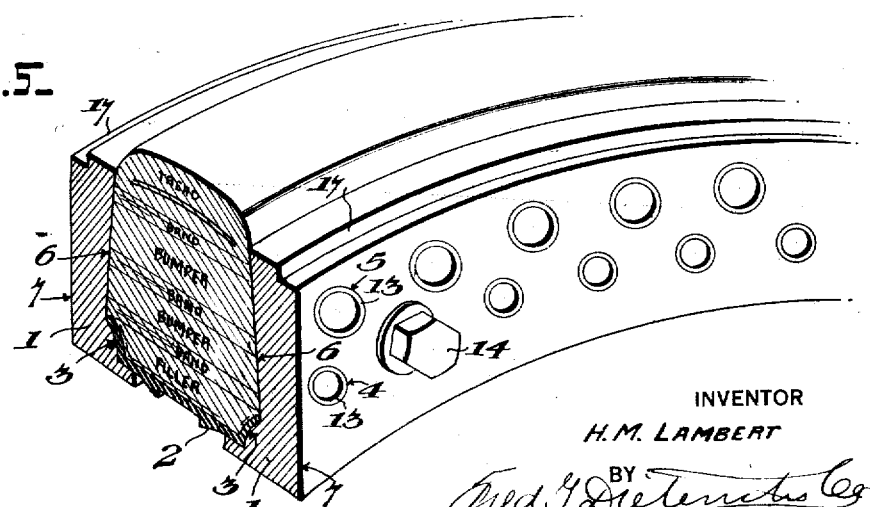

HENRY M. LAMBERT, OF PORTLAND, OREGON.

TIRE-MOLD.

1,386,512. Specification of Letters Patent. Patented Aug. 2, 1921.

Application filed February 19, 1919, Serial No. 278,018. Renewed February 4, 1921. Serial No. 442,590.

*To all whom it may concern:*

Be it known that I, HENRY M. LAMBERT, a citizen of the United States, residing at Portland, in the county of Multnomah and State of Oregon, have invented certain new and useful Improvements in Tire-Molds, of which the following is a specification.

My invention relates to certain new and useful improvements in molds for use in manufacturing cushion tires of the type disclosed in my application for patent Serial No. 200478, filed November 6, 1917.

In manufacturing tires of this character the tire is built up on the rim between side mold plates, preferably according to the method disclosed in my copending application filed on the 19th day of February, 1919, Serial No. 278,917 and after the tire is built up a final compression force is applied to constrict the mass within the mold so as to place the matter under heavy pressure during the vulcanizing act.

The present invention has for its object to provide mold forms for use in connection with the manufacture of tires, such as above described, of a simple, inexpensive construction that can be quickly and effectively employed and from which the tire can be quickly and easily removed after vulcanization.

In the drawings, I have illustrated two preferred forms of the invention, and by reference to which it will be seen that:

Figure 1 is a cross section through the mold showing a tire in place with the parts in the position they assume after the application of compacting pressure to the mold plates.

Fig. 2 is a side elevation of the same.

Fig. 3 is a view similar to Fig. 1 illustrating a modified form of the apparatus.

Fig. 4 is a detail side elevation of the structure shown in Fig. 3.

Fig. 5 is a sectional perspective view showing the tire built up between the mold plates before the peripheral or annular plates have been placed and before the tire has been vulcanized.

Referring now to the accompanying drawings in which like numerals of reference indicate like parts in all of the figures, 1 represents the two side plates or forms between which the tire is built up. 2 designates a base ring preferably formed in sections and shaped at 3 to receive the rim on which the tire is built up. The tire may be built up in the mold on the ring 2 without the rim 3, if desired. The side plates 1 have portions $1^x$ overlapping the base ring 2.

The plates 1 are provided with one or more annular series of holes 4 and 5, those of one series being staggered with relation to those of the other series and corresponding holes of opposite side plates are alined with one another and receive the core pipes 13. The opposing faces 6 of the mold plates are shaped to give the desired configuration to the sides of the tires.

In the form shown in Figs. 1 and 2, the peripheral edges 8 of the plates 1 are flat to receive the ring-like peripheral mold element 9, the latter being made in sections which are provided, when non-skid treads are desired, with projections 10 that are adapted to be pressed into the tread rubber and give the desired form to the tread of the tire.

The sections of the peripheral mold element 9 have their external faces 11 beveled, as shown in Fig. 1, to coöperate with the correspondingly faced ring 12 which, when driven on from left to right in Fig. 1, will cause the members 9 to be brought with their meeting edges 22 in contact and to contact the peripheral edges 8 of the side plates 1—1, thereby closing the mold.

The outer faces of the side plates 1—1 of the mold are flat, as at 7, for a purpose presently to appear.

14 indicates tie bolts which pass through certain of the pipes 13 and which may be used to hold the side plates 1 together during the building up of the tire, (or any other suitable means may be employed for the purpose).

In using the invention, the rim is placed in the mold after having had the base part of the tire, consisting of the lower band and the filler, formed on the rim. The rim is placed in the mold and the lower series of core pipes 13 are positioned in the holes 14 and the tire built up until the level of the upper series of holes is reached. After which, the next series of pipes 13 is located in the holes 5 and the remainder of the tire built up, as described in my method application, Serial No. 278,917 before referred to. It should be understood that in building up the tire, the side plates 1 are preferably not drawn all the way together to their final position but (see dotted lines Fig. 3) the tire is built in while the mold plates 1 are separated slightly. As soon as the tire has been built up between the plates 1 the peripheral sections 9 of the mold are placed around the same and the ring 12 driven together to bring the meeting edges 22 of the sections 9 together and bring the sections 9 into engagement with the peripheries of the plates 1, after which, pressure is applied to bring the plates 1 toward each other to their final position shown in Fig. 1, thereby bringing the material within the mold under considerable pressure tending to compact the same. The mold is then placed in a vulcanizing kettle and the tire vulcanized while under pressure.

The drawing together of the plates 1—1 to their final position for applying the required lateral pressure to the mass may be accomplished by the use of the bolts 14, (or any other suitable clamping means) but where a vulcanizing kettle having a compressing plunger is employed, the bolts 14 (or clamps) are removed before the molds are put into the kettle, and the molds are laid, one on top of the other, with the flat faces 7 lying in engagement one with the other. The plunger of the vulcanizing kettle is then operated to compress the stack of molds thereby applying the required compression force to the plates 1 to compact the mass of the tire in the direction of the axis of the same. It will be noticed that the width of the member 9 is the same as the final width of the mold between the side plates 1 after the side plates 1 have been moved inwardly to their maximum position and the length of the pipes 13 preferably corresponds to the over-all width of the mold. The member 9 is centered with relation to the side plates 1 by springs 9ˣ. Should the ring 9 not have been placed exactly central by the attendant it will be centralized by the springs 9ˣ and forced to its central position during the compression of the parts in the vulcanizing kettle, as will be clear to those skilled in the art, and the lengths of the pipes 13 as well as the width of the member 9 will serve to limit the movement of the plates 1 toward each other during the compression act.

If desired the tire may be built up directly in the mold without using a rim and in that event the side plates 1 will be made integral with the base ring 2, (the separation at 2ˣ, Fig. 1, being omitted) and a light band will be laid over the space 2ʸ between the partly separated sections of the ring 2. Pinch bar holes 9ʸ and over-flow holes 9ᶻ, if desired, are also provided as shown in dotted lines in Fig. 1.

In Figs. 3, 4 and 5, I have shown a modification of the invention in which the side plates each have their peripheral surfaces stepped, as at 17, to correspond with the similarly stepped portion 18 of the annular members 15. The members 15 in this form not only serve to form the annular or peripheral faces of the tread but coöperate with the forming faces 6 of the side plates to form the sides of the tread portion of the tire, the members 15 having their projections provided with surfaces 16 coöperate with the surfaces 6, as shown in Fig. 3. In this form also two annular or ring-like bodies 15 are employed separated on their midplane by diverging surfaces which meet at 20 in an edge lying in the midplane of the mold when the parts are assembled. The members 15 are drawn together by bolts 21 which pass through flanges 19 and when a non-skid tread is to be made, the ribs 10 are provided on the members 15 and in that event the members 15 will be made in sections with their ends 22 adapted to be brought into engagement by bolts 24 passing through lugs 23 but when a smooth surface tread is to be made, the members 15 can be made in continuous rings, if desired.

In using this form of the invention, the tire is built up as shown in Fig. 5 and then the rings 15 are placed and bolted together. In drawing the rings 15 together by the bolts 21, any excess rubber will be pressed out and sheared off by the engaging edges 20, as shown in Fig. 3 during the final drawing together of the parts. The dotted lines in Fig. 3, indicate the position of the parts during the building up of the tire before the final compression has taken place.

If it is desired to utilize the plunger of the vulcanizing kettle for applying the compression force to the plates 1, the bolts 14 may be removed and as the outer faces 7 of the plates 1 are in parallel planes, the molds can be stacked up in the kettle and compressed by the plunger of the same. The bolts 21 lying within the limits of the planes of the faces 7—7 will not interfere with the use of the plunger 7 in the vulcanizing kettle.

After the tire has been vulcanized, the outer mold section 9 (form shown in Fig. 1) or the outer mold section 15—15 (form shown in Fig. 3) is removed, the core pipes 13 are punched out through the use of a suitable punch press, or in any other desired way, and the side plates are pried off from the tire, after which, the tire will be ready for use and the mold can be reassembled, before making up another tire.

Numerous modifications in the details of the construction of the mold can be made, depending upon the particular conditions met with in practice.

From the foregoing description, taken in connection with the accompanying drawings, it is thought the complete construction, operation and advantages of my invention will be readily understood by those skilled in the art.

What I claim is:

1. In a tire mold, the combination with the base and side plates of the mold, a sectional annulus for covering the gap between the side plates, said annulus having a tapered exterior surface, and a tapered band or ring adapted to be forced into engagement with said tapered surface to secure the annulus sections together and hold the same in position with respect to the side plates, said side plates having core pipe holes and core pipes passed through said holes from one plate to the other.

2. In a tire mold, the combination with the base and side plates of the mold, a sectional annulus for covering the gap between the side plates and means distinct from the side plates of the molds for holding the annulus sections together, said side plates having core pipe holes and core pipes passed through said holes from one plate to the other.

3. In a tire mold, a pair of conforming side mold plates, base parts to conform to the tire rim, a sectional annulus to fit over the peripheries of said plates and bridge the gap between the same, a clamp ring over said annulus to hold its parts together, said side plates having core pipe holes, core pipes passed through said holes from one plate to the other, and means for holding said plates in position.

4. In a tire mold, a pair of conforming side mold plates, base parts to conform to the tire rim, a sectional annulus to fit over the peripheries of said plates and bridge the gap between the same, a clamp ring over said annulus to hold its parts together, said side plates having core holes, core pipes passed through said holes from one plate to the other, means for holding said plates in position, said pipes being of a length equal to the external width of the mold when the said plates have been drawn together to their final position.

5. In a tire mold, a pair of side mold plates, base portions to conform to the tire rim, core pipes removably held by and between said plates, a peripheral mold annulus, and means to hold said annulus over the peripheries of said side plates.

6. In a tire mold, a pair of side mold plates, base portions to conform to the tire rim, core pipes removably held by and between said plates, a peripheral mold annulus, and means for applying contracting force to said side plates and annulus to compact the mass within the mold.

7. In a tire mold, a pair of side mold plates, base portions to conform to the tire rim, core pipes removably held by and between said plates, a peripheral mold annulus, means for applying contracting force to said side plates and annulus to compact the mass within the mold, said means including bolts passed through said core pipes.

8. In a tire mold, a pair of side mold plates, base portions to conform to the tire rim, core pipes removably held by and between said plates, a peripheral mold annulus, means for applying contracting force to said side plates and annulus to compact the mass within the mold, said means including bolts passed through said core pipes, said means including clamping devices for moving the mold parts toward one another.

9. In a tire mold, an outer mold form, and transversely disposed core pipes held within the form.

10. In a tire mold, an outer mold form, transversely disposed core pipes held within the mold and provisions for effecting communication between the interior of the pipes and the exterior of the mold.

HENRY M. LAMBERT.